(12) United States Patent
Woods

(10) Patent No.: US 7,102,625 B2
(45) Date of Patent: Sep. 5, 2006

(54) NOTE AND SKETCH TRANSCRIPTION DEVICE, SYSTEM, AND METHOD

(76) Inventor: Peter N. Woods, 4219 S. 8th St., Arlington, VA (US) 22204

( * ) Notice: Subject to any disclaimer, the term of this patent is extended or adjusted under 35 U.S.C. 154(b) by 506 days.

(21) Appl. No.: 10/143,786

(22) Filed: May 14, 2002

(65) Prior Publication Data

US 2003/0214489 A1  Nov. 20, 2003

(51) Int. Cl.
G09G 5/00 (2006.01)
G06K 9/22 (2006.01)

(52) U.S. Cl. .................... 345/179; 382/314
(58) Field of Classification Search ........ 345/173–179; 358/462, 471, 472, 473, 474, 478; 382/313, 382/314, 188; 178/19.01–19.07
See application file for complete search history.

(56) References Cited

U.S. PATENT DOCUMENTS

| | | | |
|---|---|---|---|
| 3,182,291 A | 5/1965 | Nassimbene | |
| 3,182,295 A | 5/1965 | Crank et al. | |
| 4,475,240 A | 10/1984 | Brogardh et al. | |
| 4,511,929 A | 4/1985 | Maeda et al. | |
| 4,856,077 A | 8/1989 | Rothfjell | |
| 5,107,541 A | 4/1992 | Hilton | |
| 5,159,321 A | 10/1992 | Masaki et al. | |
| 5,215,397 A | 6/1993 | Taguchi et al. | |
| 5,247,137 A | 9/1993 | Epperson | |
| 5,247,170 A | 9/1993 | Cardew | |
| 5,301,243 A | 4/1994 | Olschafskie et al. | |
| 5,434,371 A | 7/1995 | Brooks | |
| 5,548,092 A | 8/1996 | Shriver | |
| 5,574,804 A | 11/1996 | Olschafskie et al. | |
| 5,745,177 A | 4/1998 | Lamoure | |
| 5,748,808 A | 5/1998 | Taguchi et al. | |
| 5,774,602 A | 6/1998 | Taguchi et al. | |
| 5,781,661 A * | 7/1998 | Hiraiwa et al. | 382/188 |
| 5,939,702 A | 8/1999 | Knighton et al. | |
| 5,960,124 A | 9/1999 | Taguchi et al. | |
| 6,044,165 A | 3/2000 | Perona et al. | |
| 6,111,565 A | 8/2000 | Chery et al. | |
| 6,307,956 B1 | 10/2001 | Black | |
| 6,310,988 B1 | 10/2001 | Flores et al. | |
| 2001/0038038 A1* | 11/2001 | Rando et al. | 235/462.45 |

FOREIGN PATENT DOCUMENTS

EP  1154377 A1 * 11/2001

* cited by examiner

*Primary Examiner*—Alexander Eisen
(74) *Attorney, Agent, or Firm*—Bacon & Thomas, PLLC

(57) ABSTRACT

A cradle is arranged to be clipped onto or otherwise removably secured to a writing instrument, and to hold a camera or other optical image capture device so that images of marks made by the writing instrument may be captured and transmitted to a processor for remote display, storage, and/or processing.

5 Claims, 5 Drawing Sheets

NOTE AND SKETCH TRANSCRIPTION DEVICE, SYSTEM, AND METHOD

BACKGROUND OF THE INVENTION

1. Field of the Invention

This invention relates to a device, system, and method for electronically capturing hand-written notes and sketches.

The invention also relates to a cradle arranged to be clipped onto or otherwise removably secured to a writing instrument, and to hold a camera or other optical image capture device (such as an optical image scanner or a lens connected to a remote camera by fiber optics, hereinafter referred to as an optical reader).

In addition, the invention relates to a note or sketch transcription device that includes an optical reader or camera held by a cradle that may be clipped or otherwise removably secured to a writing instrument, and means such as an electrical cable, fiber optic cable, or wireless transmitter for transmitting images of hand-written notes from the optical reader or camera to a central processing unit as they are being written.

Furthermore, the invention relates to a system that includes an optical reader or camera, a cradle for removably clipping or otherwise securing the optical reader or camera to a writing instrument, means such as an electrical cable, fiber optic cable, or wireless transmitter for transmitting images of hand-written notes from the optical reader or camera to a central processing unit as they are being written, and a central processing unit for receiving, processing, viewing, and/or storing the optical images.

Finally, the invention relates to a hand-written note or sketch transcription method that includes the steps of removably clipping an optical reader or camera onto a writing instrument, taking notes or drawing sketches using the writing instrument while transmitting images of the notes or sketches from the optical reader or camera back to the central processing unit for storage, display, and/or analysis, removing the cradle from the writing instrument, and removably clipping the cradle onto another writing instrument.

The device, system, and method of the invention are intended to be used with any type of hand-held writing instrument including, but not limited to, pens, lead pencils, chalk, grease pencils, and markers. Among the applications of the device, system, and method of the invention are transcription of materials written on a chalkboard by teachers or coaches, notes taken by students or employees at lectures or meetings, homework assignments by a bedridden or handicapped student, crime scene and suspect descriptions or sketches taken by police officers, orders taken by servers in restaurants, prescriptions written by doctors, hand-written Chinese or Japanese ideograms, and hand-written letters in languages requiring accent or inflection marks not part of a regular alphabet, such as Vietnamese or Arabic.

A significant difference between the device, system, and method of the invention and prior devices, systems, and methods for capturing images of hand-written notes, messages, or signatures, lies in the use of the afore-mentioned cradle. The cradle permits the optical reader or camera to be retro-fitted onto any of a variety of existing writing instruments, resulting in far greater versatility than is possible with prior handwriting-transcription devices, systems, and methods.

2. Description of Related Art

Despite the widespread availability of hand-held computers, personal digital assistants, and other portable data entry devices, traditional non-electronic writing instruments such as pens and pencils remain the preferred means of taking notes and creating sketches. Such writing instruments are inexpensive, convenient to carry, extremely easy to use, and essential for spontaneous presentations such as writing of mathematical formulas during a lecture, diagraming of football or basketball plays on a clipboard, and so forth. In fact, the human hand, eye, and brain are uniquely adapted to manipulating traditional writing instruments, whereas keyboards and other computer input devices tend to strain muscles, tendons, nerves, and eyes and, in case of frequent use, can cause severe and even crippling injuries due to the un-natural motions required.

The drawback of traditional writing instruments is that there is no convenient way to enable viewing of the handwritten notes, sketches, diagrams, and the like by persons remote from the location of the writer, or of saving the notes in a form that facilitates later viewing, editing, or distribution. To accomplish such remote viewing or saving of hand-written notes, the notes must be captured electronically, but electronic capture requires laborious manual input of the notes into a computing device, or time-consuming scanning of each page of notes, and is essentially impossible when the notes are written on an impermanent medium such as a chalkboard.

It has previously been proposed to eliminate the need for manual data entry of scanning by capturing the handwritten notes or sketches as they are written, using an appropriately positioned scanner or camera. The previously proposed devices, systems, and methods most relevant to the present invention have generally fallen into three categories:

I. optical readers or cameras integrated with specially-designed writing instruments;
II. systems for capturing images of entire chalkboards and other varied writing surfaces; and
III. non-optical sensors designed to be mounted on conventional writing instruments.

The basic principle of integrating an optical reader or video camera with a writing instrument has been known at least since 1965, when U.S. Pat. No. 3,182,295 issued. As concisely stated therein, integration of the optical reader and writing instrument provides a convenient "means for indicating instantaneously at remote points whatever message is being written with the utensil." The present invention, and the devices disclosed in such later patents as U.S. Pat. Nos. 4,475,240; 5,960,124; 5,774,602; 5,748,808; 5,215,397; 5,107,541 all share this basic principle. However, despite significant advances in scanner and camera technology since 1965, integrated optical reader/writing instrument devices have yet tp attain widespread acceptance. The reason is that the prior integrated devices all possess the disadvantages, which are overcome by the present invention, that they can only be used with a single type of writing instrument, and that when the writing instrument is worn out or broken, the optical reader is rendered useless. Most individuals become accustomed-to and favor particular types of writing instruments, based on the shape of the barrel, quality of ink, lead, or other writing medium, and overall appearance of the instrument, and it is very difficult and costly to produce integrated writing/optical reader instruments that correspond in type to all of the different writing instruments currently in use. Use of the optical reader is more likely if the user does not have to give up a favored writing instrument, or abandon existing inventories of such instruments.

So far, the only way to enable transcription of notes irrespective of the type of writing instrument used to take the notes, has been to simply capture images of the entire surface on which the notes or sketches are written, as proposed in U.S. Pat. Nos. 6,044,165 and 4,511,929. These patents explicitly recognize the need to capture, for example, "handwriting on a whiteboard or chalkboard," but reject the possibility of mounting the camera on a chalk or whiteboard marker. While solving the problem of restriction to a particular writing instrument, however, such image capture systems and methods require bulky equipment and are difficult and time consuming to set up, making them impractical for most note-taking applications.

The third category of previously-proposed hand-writing capture devices, systems, and methods, involving non-optical motion sensors that may be retrofitted onto conventional writing instruments, provides greater convenience and flexibility, but in general can only be used for the more limited purpose of capturing features or characteristics of the handwriting rather than its content, and are primarily intended for signature verification. Examples include motion detectors designed to be clipped onto writing instruments, as disclosed in U.S. Pat. No. 5,781,661; a stylus housing containing a transmit portion signals to a set of receivers, the stylus housing being designed to house a variety of writing elements including chalk, pencil lead, and markers as disclosed in U.S. Pat. No. 6,111,565; and a biometrics sensor provided in the form of a "stylus grip 30 . . . that is compatible with conventional styluses and pencils," as disclosed in U.S. Pat. No. 6,307,956. The latter patent is of particular interest because the biometrics sensing "stylus grip" may be used with a "stylus" that includes an optical or imaging print sensor, but there is no suggestion in the patent to enable the grip itself to hold the optical or imaging print sensor so that the print sensor rather than the biometrics sensor may be removably secured to different writing instruments.

Also of interest as background with respect to the present invention are U.S. Pat. No. 4,856,077, which discloses an integrated optical reader/writing instrument designed to capture the crossing points of a signature rather than an image of the entire signature or other hand-written markings, U.S. Pat. No. 5,247,170, which discloses an optical reader integrated with a highlighter pen but which is designed to read the text being highlighted rather than the marks made by the highlighter pen; and U.S. Pat. No. 5,939,702, which discloses a "writing instrument having an integrated optical reader" that clearly is not designed to read text or images written by the writing instrument, as evidenced by the fact that the writing tip and reader tip are never made accessible at the same time (col. 3, lines 29–36), the reader tip being provided instead for general purpose scanning.

Finally by way of general background, U.S. Pat. Nos. 5,548,092; 5,434,371; 5,247,137; and 5,159,321 are of interest for their disclosures of writing instruments in which marks made by the writing instrument are recorded based on signals from integral, as opposed to removable, strain gauges, pressure sensors, accelerometers, and/or other types of non-optical motion or force sensors, while U.S. Pat. Nos. 6,310,988; 5,745,177; 5,301,243; and 5,574,804 disclose pen-shaped scanners and video cameras that do not include any sort of writing instrument and which therefore cannot be used to capture images of hand-written notes or sketches to be captured as they are written.

SUMMARY OF THE INVENTION

It is accordingly a first objective of the invention to provide a device, system, and/or method which enables perishable hand-written notes, messages, sketches, and the like to be electronically captured and stored as they are being written, thereby eliminating the need to manually transcribe the messages at a later time.

It is a second objective of the invention to provide a device, system, and/or method which enables hand-written notes, messages, sketches, and the like to be electronically captured as they are written, thereby enabling remote, real-time viewing of the notes, messages, sketches, etc.

It is a third objective of the invention to provide a device, system, and/or method of electronically capturing images on a chalkboard or whiteboard so as to eliminate the need for an audience to copy the images, and thereby enabling the audience to concentrate on the spoken words of the coach, lecturer, speaker, or other person writing on the chalkboard or whiteboard.

It is a fourth objective of the invention to provide a simple and inexpensive device, system, and method of capturing electronic images of notes or sketches made at crime or accident scenes, in sick rooms, during surgery, at archeological digs, behind enemy lines, in underground cable tunnels, in space, under the sea, and in other inhospitable environments, by police officers, bed-ridden patients, doctors, paramedics, scientists, engineers, reporters, restaurant servers, and others, so as to avoid the need for later manual transcription, to enable others such as commanders, teachers, hospital personnel, other scientists, editors, and cooks to view the notes as they are being taken, and to eliminate the need for preservation of a perishable writing medium such as paper.

It is a fifth objective of the invention to provide a means for conveniently preserving spontaneous mental inspirations such as architectural designs, math equations, musical notes, legal arguments, baseball rosters, medical procedures, and inventions, at the moment of inspiration, for storage and subsequent editing.

It is a sixth objective of the invention to provide a device, system, and method of transcribing or capturing hand-written notes, messages, sketches, and the like, which can be used with a wide variety of existing writing instruments, and which may further be transferred between the instruments.

It is a seventh objective of the invention to provide a device, system, and method of transcribing or capturing hand-written notes, messages, sketches, and the like, which is inexpensive to manufacture, and which enables replacement of either the writing instrument, the optical reader, or components thereof, as necessary without the need to purchase an entire new device.

These objectives are accomplished, in accordance with the principles of a preferred embodiment of the invention, by providing a device that consists of a cradle arranged to hold an optical reader or camera, and that may be removably cipped-onto or otherwise secured to a writing instrument. Preferably, the cradle includes either (i) at least one resilient member or section to enable the cradle to be easily and removably clipped onto writing instruments of different diameters, or (ii) an adjustable rigid or resilient clip that enables the cradle to be clipped onto writing instruments having a greater ranged of diameters; and (iii) a holder for an optical reader or camera.

The holder for the optical reader or camera may be integrated into the optical reader or camera, or the optical reader or camera may be removable from the holder, as well as from the writing instrument. As a result, the optical reader or camera holder section of the preferred cradle may be in the form of a clip or sleeve, may include detents or other elements designed to cooperate with corresponding openings or other elements on the optical reader or camera, and/or any other means or structures for removably or permanently attaching the optical reader to the holder, and therefore to the cradle.

In addition, the device of the preferred embodiment includes means such as an electrical cable, fiber optic cable, or wireless infrared or RF transmitter connected to or integrated with the optical reader or camera for transmitting images of hand-written notes from the optical reader or camera to a central processing unit as they are being written.

The system of the invention preferably includes the above-described device, and a central processing unit for receiving, processing, viewing, and/or storing the optical images. The central processing unit may, according to one variation of the preferred system, be arranged to receive images transmitted by the optical reader or camera and to display them for viewing, thereby requiring only a minimum of processing power. Such a system might be useful in the context of a restaurant, a system for monitoring notes taken by police officers or military personnel in the field, and so forth. On the other hand, according to a variation of the preferred system, means for storing the images may be added to the central processing unit so that the images can be both displayed and stored, or substituted for the display. Finally, the central processing unit may include processing means for recognizing, translating, or converting the images, although those skilled in the art should appreciate that such hand-writing analysis or recognition software is not required, and that the details of such software if included form no part of the present invention. Optical character recognition software is well-known and examples of suitable software may be found in the above-cited patents.

The method of the invention preferably includes the steps of not only clipping an optical reader or camera onto a writing instrument and taking notes or drawing sketches using the writing instrument while transmitting images of the notes or sketches back to the central processing unit for storage, display, and/or analysis, but also of removing the optical reader or camera from the writing instrument when the writing instrument is no longer useable or another type of writing instrument is required, and transferring the optical reader or camera to another writing instrument by clipping the cradle onto the new writing instrument. According to the preferred method, the optical reader or camera may itself be replaced by removing the optical reader or camera from the holder section of the cradle and inserting a new optical reader or camera.

DETAILED DESCRIPTION OF THE PREFERRED EMBODIMENTS

Figure 1:
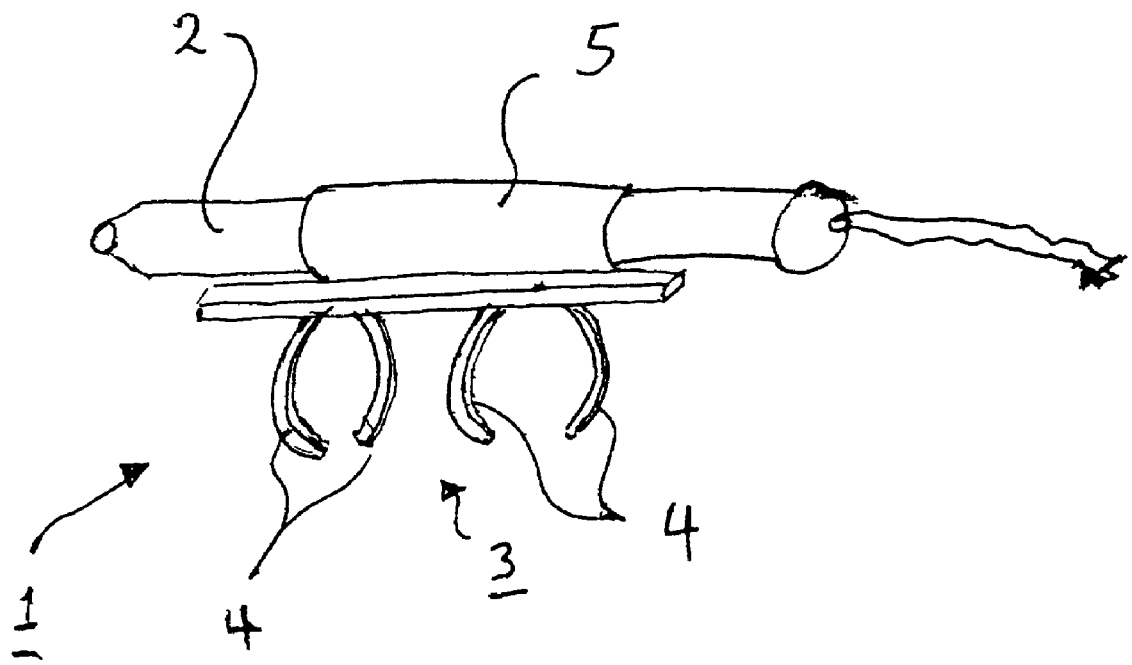
FIG. 1 is a perspective view of a cradle and optical reader/camera constructed in accordance with the principles of a preferred embodiment of the invention.

As illustrated in FIG. 1, a hand-written note or sketch transcription device according to a preferred embodiment of the invention includes a cradle 1 arranged to be removably clipped onto a writing instrument. Cradle 1 may be made of rubber, plastic, metal, or a combination of materials, and is further arranged to support an optical reader or camera 2 positioned to capture images of marks made on a writing medium by the writing instrument as the marks are being made.

As illustrated, cradle 1 includes a writing instrument clip section 3 for enabling the cradle to be removably clipped onto a writing instrument. Section 3 may consist of resilient tines 4, as illustrated, or any other mechanical arrangement for clipping the cradle onto the writing instrument, which may be a quill, brush, pen, pencil, chalk, or any other type of instrument designed to make marks on a writing medium in direct response to manipulation by the hand of the writer. By making section 3 resilient, the clip may be tightly secured to a variety of different writing instruments with slightly different diameters, although it is also within the scope of the invention to make section 3 adjustable, either by moving the tines towards or away from each other along the axis of the clip, or by including adjustable jaws or clamps driven by cams, screws, or the like, so that the cradle may be more firmly secured to the writing instrument.

Optical reader or camera holder section 5 of the cradle is a holder for the optical reader or camera 2, and has a shape corresponding to the optical reader or camera to be held thereby. The optical reader or camera 2 may be permanently affixed to the cradle by mechanical fasteners or adhesive or, preferably, the optical reader or camera may be removably positioned in or on the holder by a clip, sleeve, resilient members, or any other suitable mechanical securing arrangement.

The optical reader or camera 2 to be positioned in the holder section 5 may be any optical image capture device small enough to be mounted on the writing instrument, and may include black-and-white or color analog or digital video cameras, optical character readers, digital scanners, or any other device capable of capturing the images of marks made by the writing instrument, including lightweight plastic styluses of the type that include a lens and light guiding means for directing images to a fiber optic cable that transmits the images in optical form for remote conversion to electrical signals. Numerous sufficiently small image capture devices are known or commercially available, including devices disclosed in the above-cited patents. The optical reader or camera must be positioned so as to include the tip of the writing instrument in its field of view, and may be spaced from the writing instrument so as to enable the writing instrument to be comfortably grasped by the user in a normal handwriting position, but otherwise is not limited as to position or form.

Figure 2:
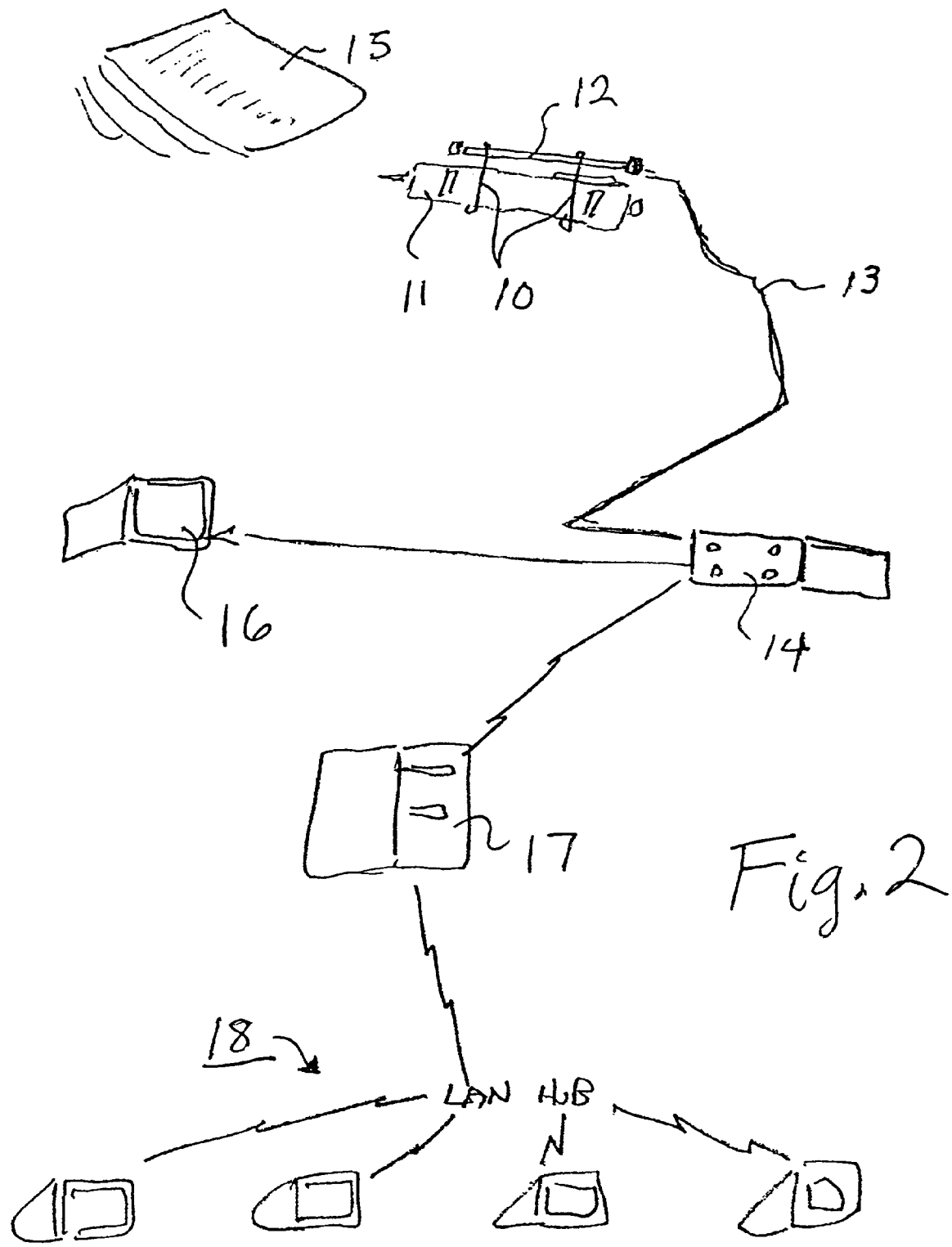
FIG. 2 is a schematic view of a note or sketch transcribing system constructed in accordance with the principles of another preferred embodiment of the invention.

In the preferred system illustrated in FIG. 2, the cradle 10 is mounted on a fountain pen 11, and the optical reader 12 is of the above-described lens type connected by a fiber optic cable 13 to an image processor 14 that converts the transmitted optical image of marks on a writing medium 15 into electronic form for real-time display on a monitor 16, for processing and storage in a central processing unit and disk drive 17, and for real-time distribution over a LAN 18 to interested parties. This embodiment is especially suitable for use by police, reporters, or scientists, with the remote image capture device being worn by the note-taker or situated in the note-taker's car or portable computing device.

Figure 3:
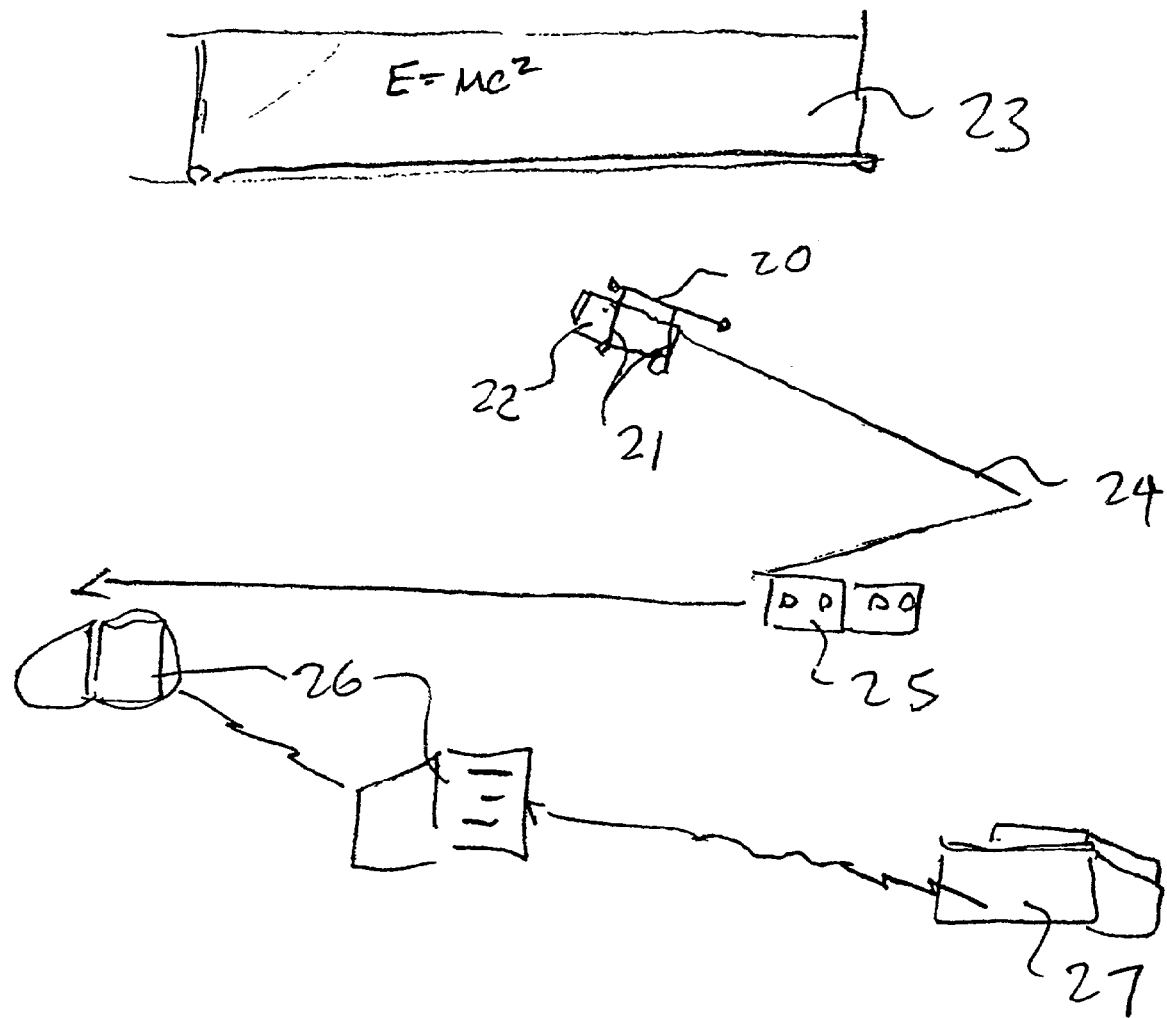
FIG. 3 is a schematic view of a first variation of the system of FIG. 2.

In the variation illustrated in FIG. 3, an image capture device 20 corresponding to the optical reader of FIG. 2 is held by a cradle 21 removably secured to a piece of chalk 22 to enable a lecturer to record images handwritten on a chalkboard 23 by transmitting the images via a fiber optic cable 24 to a processor 25, CPU/monitor 26, and printer 27.

Figure 4:
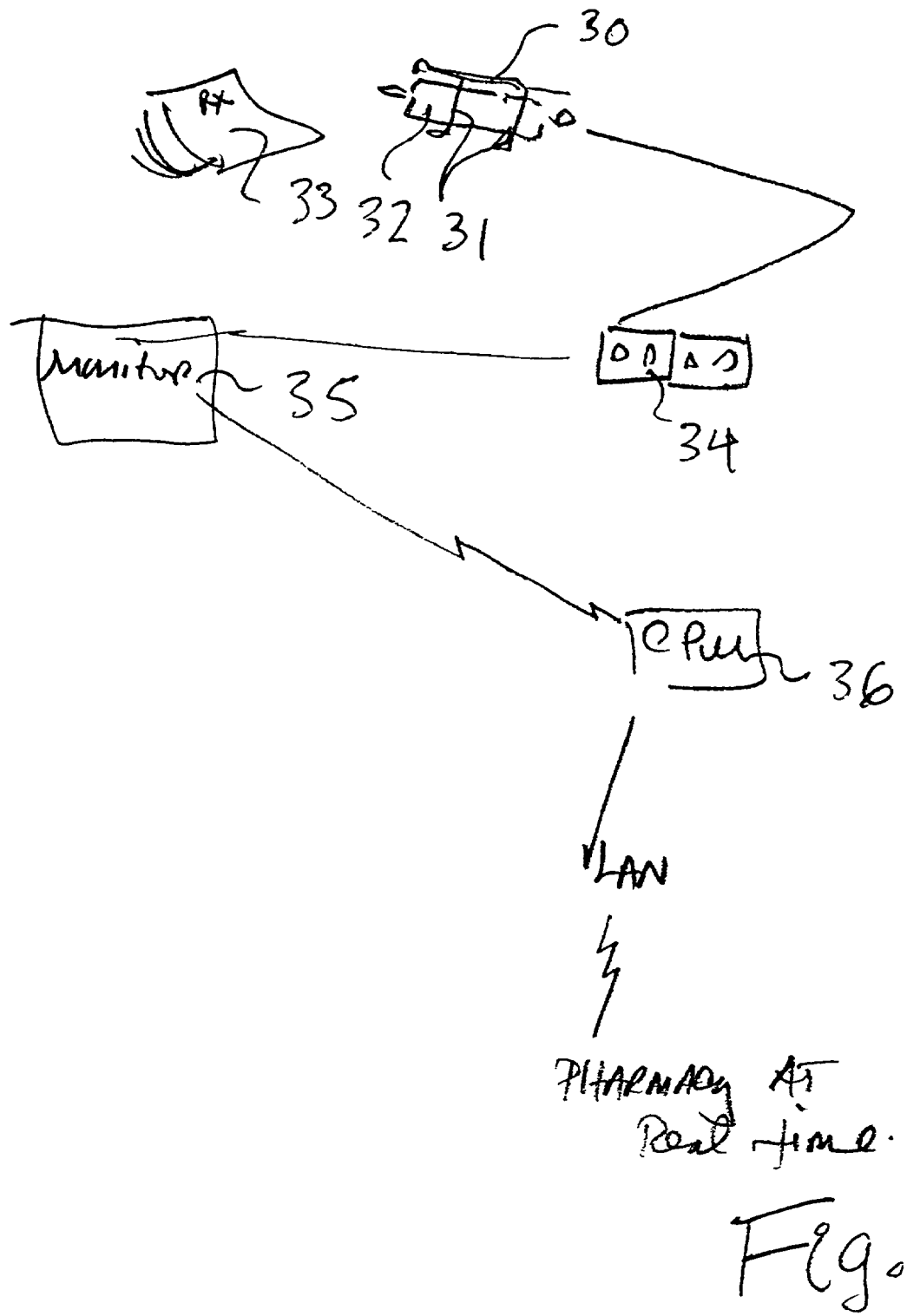
FIG. 4 is a schematic view of a second variation of the system of FIG. 2.

In the variation illustrated in FIG. 4, the image capture device 30 is held by a cradle 31 removably secured to a pen 32 to enable prescriptions written by a doctor on a pad 33 to be transmitted via processor/power supply 34 to a monitor 35 and CPU 36 to a pharmacy. In this embodiment, software at the receiving end will preferably define a space corresponding to spaces on the prescription pad in which the prescription is written, and to automatically fill-in non-handwritten information such as the doctor's name and number.

Figure 5:
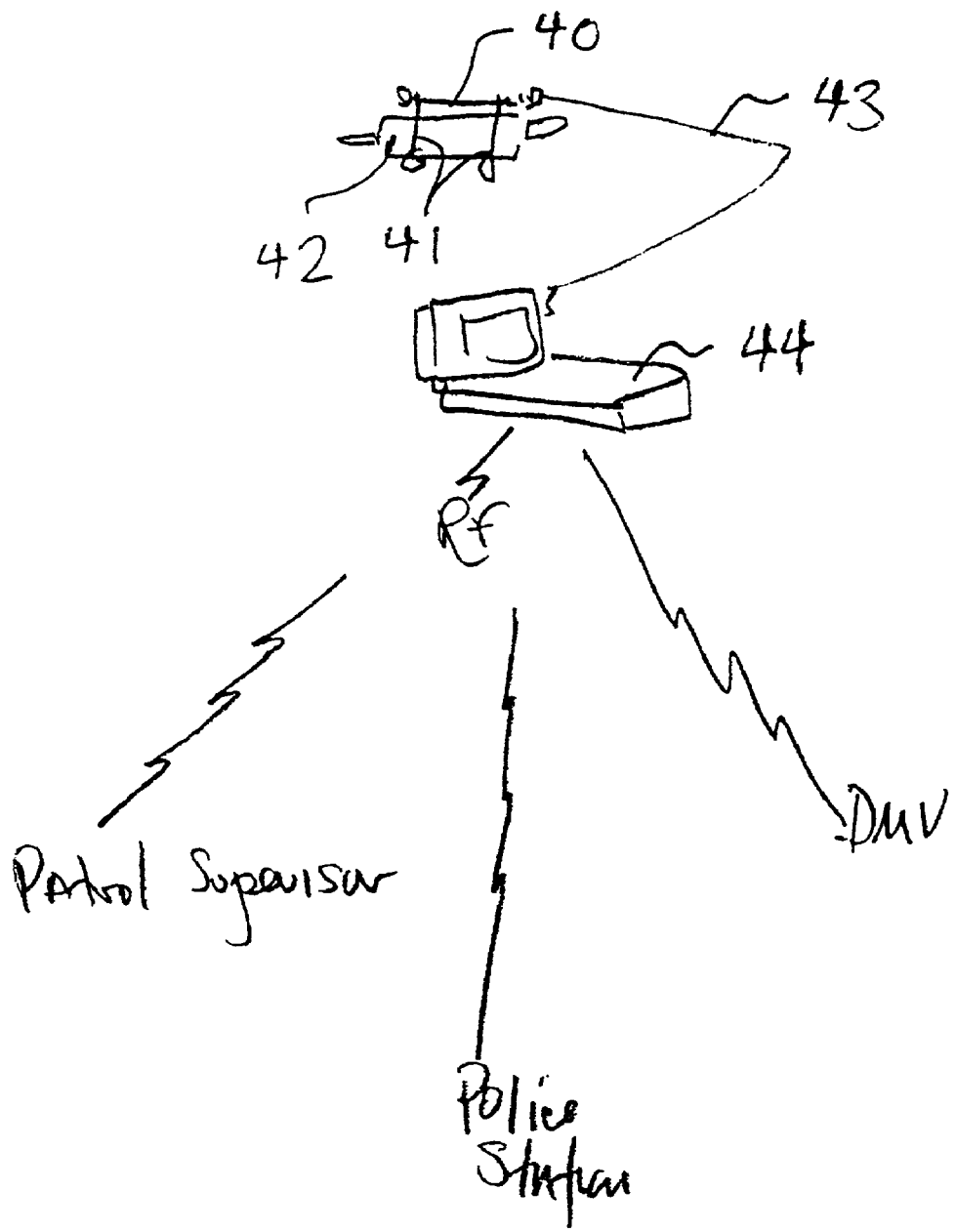
FIG. 5 is a schematic view of a third variation of the system of FIG. 2.

Finally, in the variation illustrated in FIG. 5, the image capture device 40 held by cradle 41 removably secured to writing instrument 42 is connected by an electrical cable 43 to a laptop 44 connected to a transmitter installed in a police vehicle so that traffic summons hand-written by a police officer can be transmitted in real time to a patrol supervisor, police station, and/or the department of motor vehicles.

Having thus described preferred embodiments and variations thereof in sufficient detail to enable those skilled in the art to make and use the invention, it will nevertheless be appreciated that numerous variations and modifications of the illustrated embodiment may be made without departing from the spirit of the invention. For example, the invention is not to be limited to a particular cradle construction, so long as the cradle may be removably secured to a writing instrument, to a particular camera or optical reader configuration, or to a particular application. It is therefore intended that the invention not be limited by the above description or accompanying drawings, but that it be defined solely in accordance with the appended claims.

I claim:

1. A device for transcribing hand-written notes or sketches, comprising:
   hand-written note or sketch capture means including a camera or optical reader for capturing optical images of marks made by a writing instrument;
   a cradle arranged to be removably secured to said writing instrument, said cradle including:
      a writing instrument gripping section arranged to secure said writing instrument, said writing instrument gripping section comprising pairs of resilient tines; and
      a holder section in which is positioned said camera or optical reader, said holder section being arranged to position the camera or optical reader so as to capture optical images of said marks made by said writing instrument secured to the writing instrument gripping section; and
   means for transmitting said images of said marks from the optical reader or camera to a central processing unit as they are being written.

2. A note or sketch transcription device as claimed in claim 1, wherein said holder section is a sleeve adapted to hold an optical stylus including a lens and a fiber optical cable connection.

3. A note or sketch transcription device as claimed in claim 1, wherein said camera or optical reader is permanently attached to said holder section.

4. A note or sketch transcription device as claimed in claim 1, wherein said camera or optical reader is removably positioned in said holder section.

5. A note or sketch transcription device as claimed in claim 1, wherein said image transmitting means is selected from the group consisting of an electrical cable, a fiber optic cable, and a wireless transmitter.

* * * * *